United States Patent [19]

Burghardt

[11] Patent Number: 4,597,545
[45] Date of Patent: Jul. 1, 1986

[54] SEAT BELT TENSIONING SYSTEM

[75] Inventor: Wilfried Burghardt, Altomuenster, Fed. Rep. of Germany

[73] Assignee: Britax-Kolb GmbH & Co., Dachau, Fed. Rep. of Germany

[21] Appl. No.: 732,457

[22] Filed: May 9, 1985

[30] Foreign Application Priority Data

May 14, 1984 [DE] Fed. Rep. of Germany ....... 3417863
May 14, 1984 [DE] Fed. Rep. of Germany ....... 3417877

[51] Int. Cl.$^4$ ..................... B60R 22/42; B60R 22/46
[52] U.S. Cl. ............................ 242/107.2; 242/107; 242/107.4 C; 280/806
[58] Field of Search ....... 242/107.2, 107.4 R–107.4 E, 242/107; 280/801–808; 297/475–478, 480; 180/268–270

[56] References Cited

U.S. PATENT DOCUMENTS

| 3,347,488 | 10/1967 | Quinting | 242/107.4 R |
| 3,667,805 | 6/1972 | Apri . | |
| 3,871,470 | 3/1975 | Schwanz et al. | 180/268 X |
| 4,394,034 | 7/1983 | Murphy et al. | 242/107.2 X |
| 4,429,920 | 2/1984 | Kondziola | 242/107.4 A X |
| 4,492,348 | 1/1985 | Ziv et al. | 242/107.2 |

FOREIGN PATENT DOCUMENTS

| 1630477 | 8/1971 | Fed. Rep. of Germany . |
| 2402163 | 8/1974 | Fed. Rep. of Germany . |
| 3327970 | 2/1985 | Fed. Rep. of Germany ... 242/107.4 A |
| 1450902 | 9/1976 | United Kingdom . |
| 1528908 | 10/1978 | United Kingdom . |
| 1590104 | 5/1981 | United Kingdom . |
| 2085709A | 5/1982 | United Kingdom . |

Primary Examiner—John M. Jillions
Attorney, Agent, or Firm—Hayes, Davis & Soloway

[57] ABSTRACT

A seat belt tensioning system for a motor vehicle comprises a locking retractor for a seat belt and a pre-tensioning device for pre-tensioning the seat belt, the pre-tensioning device comprising mounting means for mounting the retractor on a fixed mounting member, the mounting means permitting movement of the retractor in a direction opposite to the protraction direction of the belt. Such movement of the retractor may be caused by a cable coupled to the front bumper of the vehicle.

13 Claims, 5 Drawing Figures

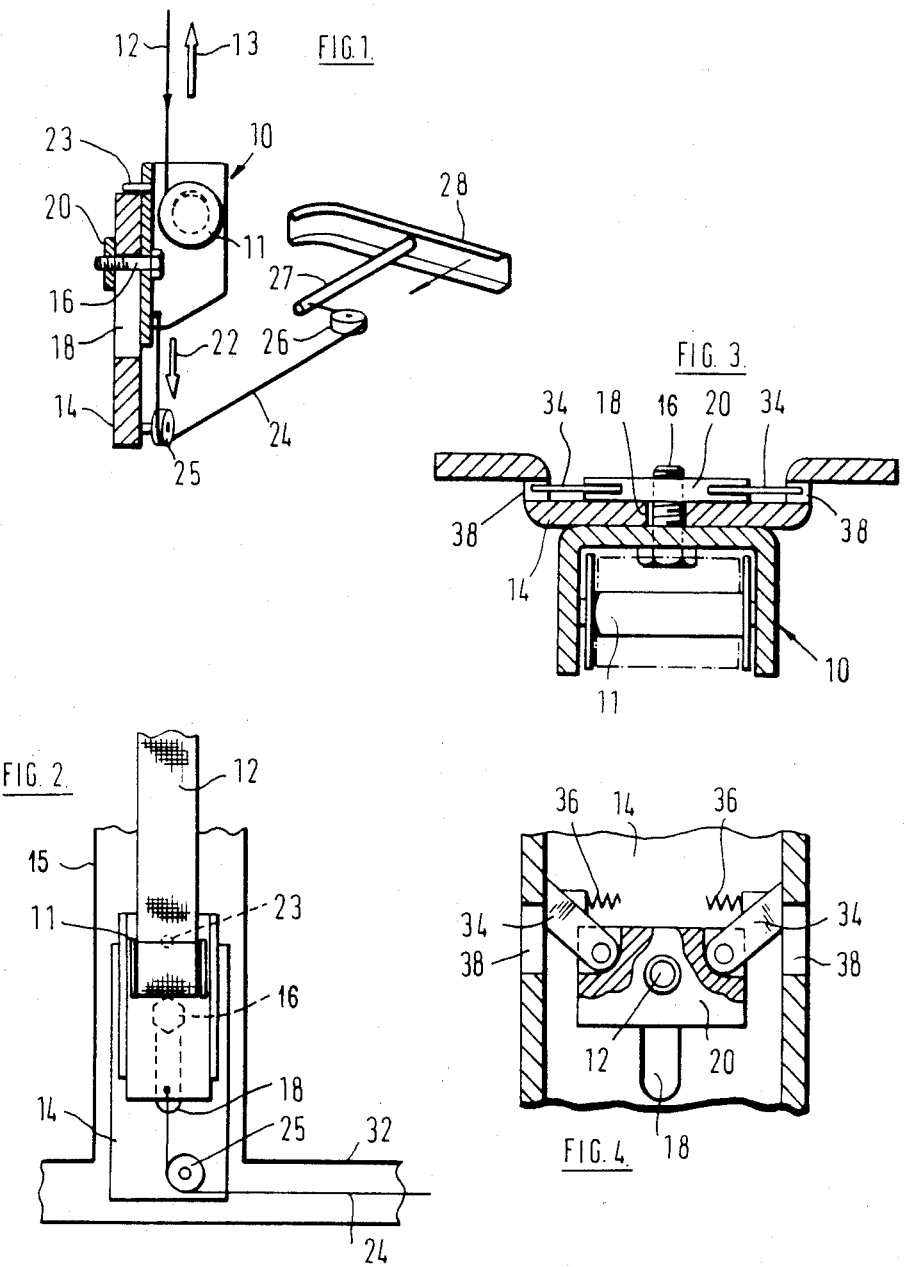

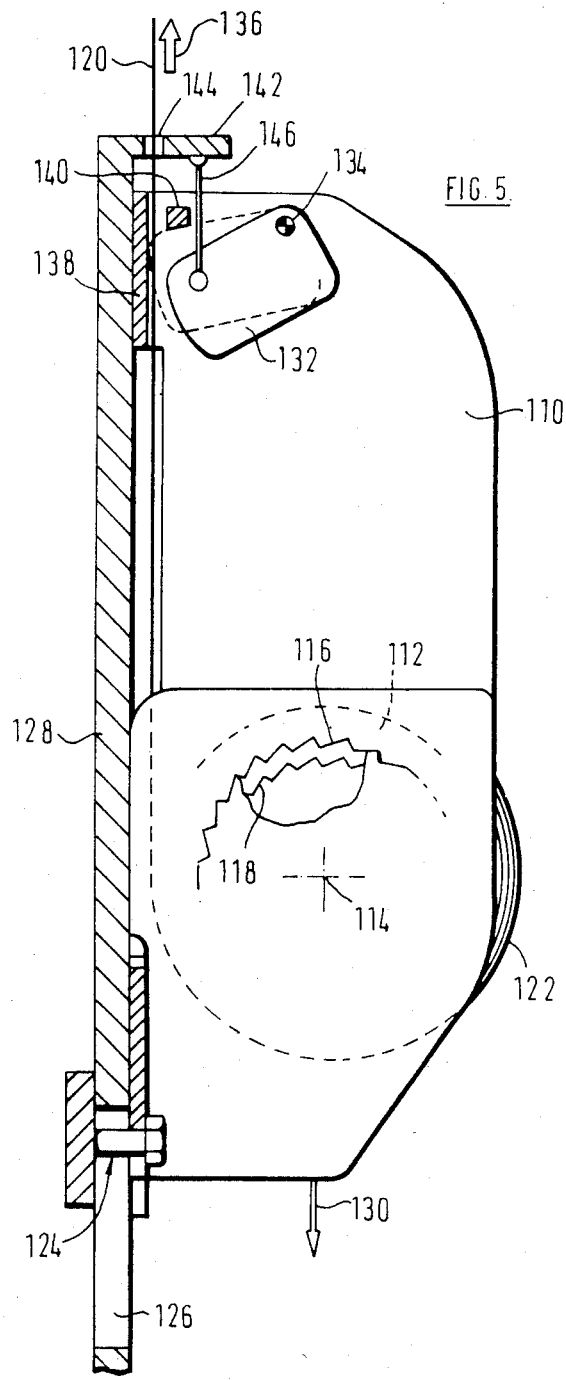

SEAT BELT TENSIONING SYSTEM

This invention relates to a seat belt tensioning system for a motor vehicle.

In normal driving a seat belt is kept as loose as possible so that it does not inconvenience the vehicle occupant. This relaxed state of the seat belt however operates disadvantageously when deceleration due to an accident occurs, in that the belt operates relatively late in the initial phase of movement of the occupant's body. It is desirable to tension the seat belt to a predetermined amount against the occupant's body during a initial phase, in which the vehicle occupant's body has still not moved forward in response to the deceleration. For this purpose mechanical, hydraulic and pyrotechnic devices have already been proposed, one such hydraulic device being actuated by displacement of a bumper of the vehicle.

Almost all well-known systems operate by rotating the shaft carrying the belt reel in the retraction direction in order to pretension the belt, for which purpose an extension to the reel shaft must be provided to accommodate means for applying the necessary force. This entails an increase in size for the retracting and locking mechanism which is a disadvantage if the whole mechanism is to be fitted behind panelling and preferably in the B-post of the vehicle. Moreover pre-tensioning by winding the belt on to the reel has the disadvantage that the more belt on the reel, the greater the length of belt which can be pulled off after locking due to compression of the belt on the reel.

According to the invention a seat belt tensioning system for a motor vehicle comprises a locking retractor for a seat belt and a pre-tensioning device for pre-tensioning the seat belt, the pre-tensioning device comprising mounting means for mounting the retractor on a fixed mounting member, the mounting means permitting movement of the retractor in a direction opposite to the protraction direction of the belt.

An embodiment of the invention will now be described, by way of example, with reference to the accompanying drawings in which:

FIG. 1 is a schematic view of a pre-tensioning device in accordance with the invention;

FIG. 2 is a part side view of the arrangement shown in FIG. 1;

FIG. 3 is a horizontal cross-sectional view showing details of the mounting means for locking retractor;

FIG. 4 is a fragmentary vertical sectional view of the parts shown in FIG. 3; and FIG. 5 is a side view of a locking retractor incorporating a belt clamp which can be used with the embodiment of FIGS. 1 to 4.

FIGS. 1 and 2 show a locking retractor 10 for a safety belt system having a spool 11 from which a belt 12 can be protracted in the direction indicated by the arrow 13. The retractor 10 is connected to a mounting plate 14, which is secured to the B-post 15 of a motor vehicle. The connection between the mechanism 10 and the mounting plate 14 comprises a stud 16, which projects through a slot 18 in the mounting plate 14 and is connected on the other side to a guide plate 20, which is in contact with the rear of the mounting plate 14. This connection allows the retrator 10 to move in the direction indicated by an arrow 22. However the mechanism 10 is normally held at the uper end of its range of movement by a pin 23 which can be sheared off by application of a specified force.

The bottom of the retractor 10 is connected to one end of a cable 24 which runs round pulleys 25 and 26 and has its other end attached to a bar 27. The cable 24 is accommodated in a longitudinal member 32 of the motor vehicle frame (see FIG. 2). Since 60% of accidents are frontal collisions, the bumper 28 is preferably the front bumper so that bumper movement in frontal impact can be utilised for pre-tensioning the belt, as will be explained hereinafter.

As can be seen from FIGS. 3 and 4, the guide plate 20 is provided with two ratchet pawls 34 which are pivotally mounted and biased outwardly by springs 36. As can be seen in FIG. 3, the mounting plate 14 is of U-shaped cross-section. When the retractor 10 moves downwardly along the mounting plate 14, the pawls 34 slide along the sides of a U-shaped channel formed by the mounting plate and engage in locking holes 38 therein, so that the retractor 10 can be held in various positions against upward movement.

The manner of operation is as follows. When a frontal collision occurs, the bumper 28 moves rearwardly relative to the vehicle's direction of forward movement. This causes displacement of the cable 24 and hence shearing of the pin 23 followed by movement of the retracting and locking mechanism 10 in the opposite direction to the protraction drection 14 of the seat belt 11, thus tensioning the seat belt 11. The final position of the retraction and locking mechanism 10, which is chosen to ensure the belt tension does not become too great, is maintained by engagement of the pawls 34 in respective locking holes 38. There is no risk of the seat belt 11 unwinding from the reel 11, since the first phase of the impact the locking mechanism of the unit 10 will have locked the reel 11. Pre-tensioning of the seat belt 11 is thus effected before the vehicle occupant's body is thrown forward with the result that the seat belt system is effective immediately, even though, in normal driving, the belt does not inconvenience the vehicle occupant by being too tight.

Movement of the bumper 28 may take place as a result of distortion of its mountings during an accident. Alternatively, the bumper 28 may be mounted in guides which permit a limited amount of longitudinal movement without damage to the bumper mountings.

Instead of being connected to the bumper 28, the cable 24 may be connected to a weight which is slidably mounted in guides in the door of a motor vehicle, and secured, for example by a shear pin, so that it moves only when deceleration forces exceed a specified value.

FIG. 5 shows an alternative form of retractor which may be used instead of the retractor 10 of FIGS. 1 and 2. The retractor illustrated in FIG. 5 consists of a housing 110 in which a reel 112 is mounted to rotate about an axis 114. The locking mechanism consists of a concave toothed segment 116 on the housing, and a toothed wheel 118 on the reel. A seat belt 120 is wound on the reel 112. The whole housing 110 is secured by a bolt 124 which engages in a slot 126 is a mounting plate 128. The housing 110 is therefore free to move in a direction opposite to the protraction direction of the seat belt 120 as indicated by the arrow 130. A clamping member 132 is pivotally mounted on the upper part of the housing 110 so as to be movable about an axis 134, and thus into contact with the seat belt 120, in the same direction as the seat belt 120 is protracted, as shown by the arrow 136. The free position of the clamping part 132 is indicated in solid lines, the clamping position in dotted lines.

In the clamping position the clamping part 132 presses the seat belt against a clamping plate 138 formed on the housing. If the seat belt is pulled in the pull-off direction indicated by the arrow 136, the clamping force is thereby increased. Excessive pivoting of the clamping part 132 in this direction is limited by a stop 140.

At the top of the mounting plate 128 there is a bracket 142 with a slot 144 for the belt 120 to pass through. The underside of this bracket 142 is linked by a control rod 146 to the clamping part 132. This control rod 146 is so designed that it breaks under overload. A cable can be used instead of the control rod 146.

The housing 110 may be secured in its uppermost position, for example by means of a shear pin (not shown) as described above with reference to FIGS. 1 and 2. Alternatively, it may be resiliently biased into its uppermost position.

The retractor illustrated in FIG. 5 operates as follows. If due to an accident there is a sharp deceleration of the vehicle in which for example the seat belt system is fitted, then the locking mechanism of the retractor locks and, at the same time, a downward force is applied to the housing 110, as indicated by arrow 130, by apparatus similar to that illustrated in FIG. 1 to 4. The resulting displacement of the housing 110 relative to the mounting plate 128 and the bracket 142 causes the rod 146 to move the clamping part 132 into its clamped position, in which it clamps the belt 120 against the clamping plate 38. This prevents tension in the belt 120 from tightening the coils 122 of belt on the reel 112. If the load in the direction of the arrow 130 is very great, the control rod 146 fractures, allowing further downward movement of the housing 110 and thus further tightening the belt 120.

Instead of apparatus similar to that illustrated in FIGS. 1 and 2, a known mechanical, hydraulic or pyrotechnic device may be used to apply the downward force on the housing 110 in the direction of the arrow 130. However the inertia-responsive sensor of such a device must be capable of differentiating between an actual collision and the type of impact vibration which occurs for example with a hammer blow on parts of the coachwork or when driving over a bumpy road.

I claim:

1. A seat belt tensioning system for a motor vehicle comprising a locking retractor for a seat belt, means defining a protraction direction for the belt and a pre-tensioning device for pre-tensioning the seat belt, the pre-tensioning device comprising mounting means for mounting the retractor on a fixed mounting member so as to permit movement of the retractor in a direction opposite to the protraction direction of the belt, and traction means connected to the retractor and adapted to move the retractor in said direction and simultaneously effect locking of the retractor.

2. A system according to claim 1, wherein the retractor is held in its initial position by a shear pin.

3. A system according to claim 1, wherein the means for mounting the retractor on the mounting part comprises a slot guide.

4. A system according to claim 2, further comprising a ratchet mechanism for locking the retractor in predetermined positions within its range of movement.

5. A system according to claims 4, wherein the slot guide comprises a stud secured to the retractor and projecting through the slot, and a retaining plate attached to the stud behind the mounting member, and the ratchet mechanism comprises a pawl mounted on the retractor and adapted to engage in locking holes in the mounting member.

6. A system according to claim 5, wherein the mounting member includes a part of U-shaped cross-section, with the slot in the base of the U-shaped and the locking holes in a side arm of the U-shape.

7. A system according to claim 1, wherein the traction means comprises a traction element which is connected to an exposed part of the vehicle and is adapted to transmit displacement thereof to the retractor in the event of a collision.

8. A system according to claim 7, further comprising two pulleys, the traction element being a cable running over said pulleys.

9. A system according to claim 1, further comprising a clamping member, coupling means coupling the clamping member between the retractor and the fixed mounting member, the coupling means being operative to move the clamping member into a position of engagement with the seat belt in response to said movement of the retractor relative to the mounting means in said direction opposite to the protraction direction of the belt.

10. A system according to claim 9, wherein the retractor has a housing, a clamp plate being mounted on the housing on the side of the seat belt opposite to the clamping member.

11. A system according to claim 9, wherein the clamping member is pivotally mounted on the retractor and a link couples the clamping member to the mounting member by a link.

12. A system according to claim 11, wherein a bracket projects from the fixed mounting member and has a slot through which the seat belt runs, the link being attached to the bracket.

13. A system according to claim 12, wherein the link is arranged to break when a predetermined load is exceeded.

* * * * *